Patented Nov. 6, 1945

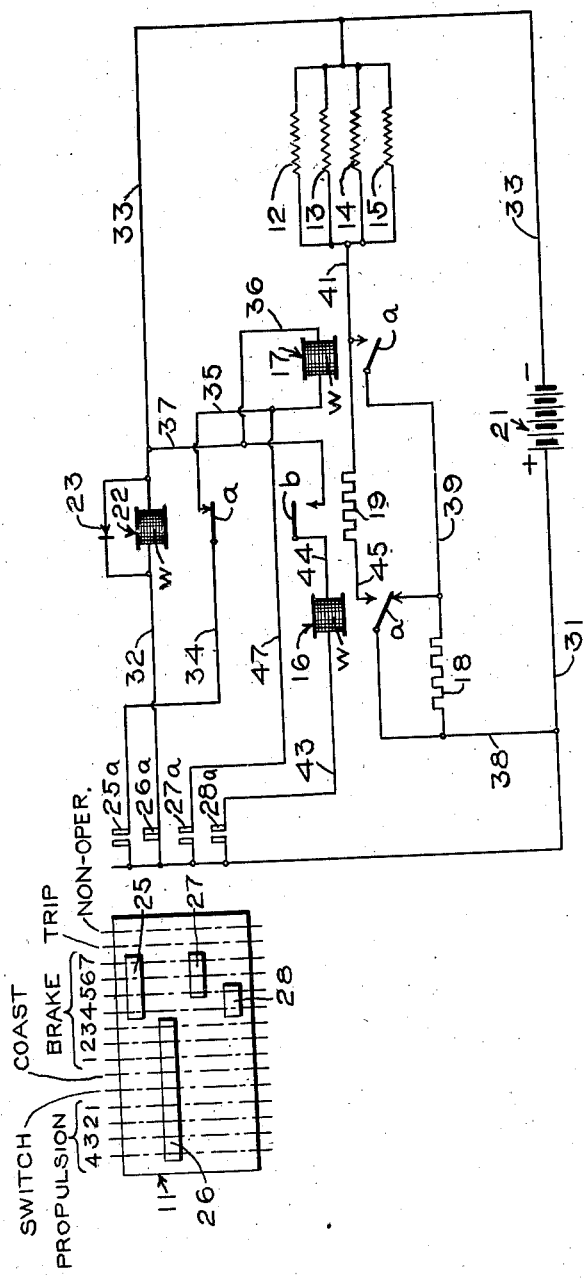

2,388,237

UNITED STATES PATENT OFFICE 2,388,237

MAGNETIC TRACK BRAKE CONTROL APPARATUS

Philip L. Crittenden, Edgewood, Pa., assignor to The Westinghouse Air Brake Company, Wilmerding, Pa., a corporation of Pennsylvania Application February 27, 1943, Serial No. 477,398

5 Claims. (Cl. 188—165)

This invention relates to magnetic track brake control apparatus and has particular relation to control apparatus for magnetic track brake devices of the spring-suspended type that are actuated downwardly into frictional contact with the associated track rails solely by energization of the electromagnetic winding or windings of the track brake devices.

Magnetic track brake devices are commonly provided on modern present-day street railway cars to provide a braking effect supplemental to that of other brakes such as dynamic brakes and friction brakes associated with wheels of the vehicle. Such magnetic track brake devices are usually suspended from the side frames of the wheel truck, on helical or coil springs, between the leading and trailing wheels on each side of the truck and are actuated downwardly in opposition to the supporting springs into frictional engagement with the track rails by energizing the electromagnetic windings of the track brake devices to a degree sufficient to produce the necessary magnetic attractive force between the track brake devices and the rails.

In order to prevent vertical oscillatory movement of the track brake devices sufficient to cause the track brake devices to strike the rails while the vehicle is in motion and the brakes released, the track brake devices are ordinarily suspended a distance varying from one-half inch to one inch above the track rails. It is necessary therefore to energize the electromagnetic winding of the track brake devices to a degree having a relatively high percentage of the maximum energization thereof in order that a magnetic attractive force be produced sufficient to overcome the upward biasing force of the suspension springs and effect engagement of the track brake devices with the track rail. Due to the high degree of energization of the electromagnetic winding at the instant the track brake devices engage the rail, an undesirable shock is produced on the wheel truck and on the car itself at the time the track brakes are first applied. This initial shock of application is accentuated by the increased magnetic attraction resulting from the diminution in the air gap between the track brake device and the track rails when the track brake device is shifted into contact with the track rail.

In the usual control of magnet track brake devices, the degree of energization of the magnetic track brake winding may be increased from the initial degree required to overcome the initial high reluctance of the air gap between the track brake device and the track rail but may not be decreased therefrom. Since the initial energizing current of present-day magnetic track brake devices is a relatively high percentage of the maximum degree of energization, the range of variation in the degree of braking effect produced by the magnetic track brake devices is correspondingly limited.

It has heretofore been proposed to provide apparatus, including a contact device carried by a magnetic track brake device, responsive to the engagement of the track brake device with a track rail for effecting a reduction in the degree of energization of the track brake winding. Such apparatus reduces the shock of first application of the track brake device and at the same time inherently widens the range of braking effect that is capable of being produced by the magnetic track brake device.

It is an object of my present invention to provide novel control apparatus, not involving any contact device carried by the magnetic track brake device, effective to control the energization of the track brake winding in a manner to minimize the shock of first application as well as to widen the range of braking effect capable of being produced by the track brake device.

Essentially, the above object is attained by providing timing means in the form of a slow-acting relay which is first effective, when application of a train brake device is initiated by the operator, to cause energization of the winding of the track brake device to a relatively high degree regardless of the degree of energization called for by the operator and maintain such relatively high degree of energization for a certain interval of time substantially corresponding to that required to move a track brake device into contact with the rail; and then effective to restore the control of the energization of the track brake winding to the operator.

The apparatus provided according to my present invention thereby obviates the need for any additional contact mechanism, carried by the track brake devices, which may be easily damaged as by being struck by flying stones or the like.

The above object, and other objects of my invention, which will be made apparent later, are attained by an illustrative apparatus hereinafter to be described and shown in the accompanying single diagrammatic figure of the drawing.

Description

The magnetic track brake control apparatus comprising my present invention may be employed in any type of vehicle brake control system in combination with other types of brake devices, such as dynamic brake devices and friction brake devices associated with the wheels of the vehicle. For simplicity, I have omitted from the drawing any representation of other types of brakes but it will be understood that the magnetic track brake control apparatus of my present invention may be coordinated with dynamic brake control and friction brake control in any desired or known manner.

Referring to the single figure of the drawing, I have shown a conventional combined propulsion and braking controller 11 whereby the operator may control the application and release of magnetic track brake devices, as well as the degree of application thereof. The magnetic track brake devices are represented diagrammatically by their respective electro-magnetic windings 12, 13, 14, and 15, it being understood that the magnetic track brake devices themselves are suspended on helical or coil springs from the truck side frames of railway vehicles a convenient distance above the track rails in conventional manner.

Associated with the controller 11 are two standard and relatively fast-acting control relays 16 and 17 which function to control the connection of two resistors 18 and 19 in the circuit of the magnet windings 12, 13, 14, and 15 whereby to control the degree of energization thereof by current supplied from a suitable source, such as a storage battery 21. Relay 16 has a winding $w$ and a single contact $a$, hereinafter called a transfer contact. Relay 17 has a winding $w$ and a single front contact $a$.

There is additionally provided, in accordance with my invention, a slow-acting relay 22 having a winding $w$, a front contact $a$, and a back contact $b$. An asymmetric device 23, such as a half-wave rectifier of either the dry disk or tube type is connected in shunt relation to the winding $w$ of relay 22 to impart a slow-acting characteristic to the relay in well known manner. Any suitable type of slow-acting relay may be substituted for relay 22 and the asymmetric device 23.

The combined propulsion and braking controller 11 is shown diagrammatically only to the extent necessary to show the control exercised thereby over the relays 16, 17 and 22. The controller 11 is of the conventional drum or cam operated type having rotary cams 25, 26, 27 and 28 for operating switch contacts 25a, 26a, 27a and 28a diagrammatically shown in respective horizontal alignment, therewith.

An operating handle, not shown, may be provided for rotating the cams to different operating positions corresponding to the different positions of the handle.

In accordance with conventional practice, the switches 25a to 28a are assumed to be in open position for all positions of the controller 11 except those covered by the corresponding cams. Thus the switch 25a is closed only in the braking positions 4, 5, 6 and 7. Similarly, the controller switch 26a is closed in all of the propulsion positions 1, 2, 3, 4, and "switch," as well as in the coast position and braking positions 1, 2, and 3. The controller switch 27a is closed only in braking positions, 5, 6, and 7. The controller switch 28a is closed only in braking positions 4 and 5.

The operating handle of controller 11 has a central position designated "coast" in which propulsion power is off and the brakes are released. When the handle is shifted in one direction from coast position it passes successively through a number of propulsion positions designated "switch," and 1, 2, 3, and 4. When the handle is shifted in the opposite direction out of coast position, it passes successively through a number of braking positions designated 1, 2, 3, 4, 5, 6 and 7 and then through a position designated "trip" to a "non-operative" position in which position only the handle may be removed.

Operation

In order to explain the operation of the control apparatus, let it be assumed that the controller 11 is in a propulsion position, such as position 4, wherein the car is being driven under power. In such case, the winding $w$ of the relay 22 is energized under the control of the controller switch 26a. The circuit for energizing the winding of the relay 22 extends from the positive terminal of the battery 21, marked "+", by way of a wire 31, controller switch 26a, a wire 32, winding $w$ of the relay 22, and a wire 33 to the negative terminal of the battery 21, marked "—". The asymmetric device 23 is connected in shunt relation to the winding $w$ of the relay 22 in such a manner that a relatively high resistance is provided thereby to the flow of current in the right-hand direction corresponding to flow from the positive to the negative terminal of battery 21. Consequently, it is ineffective as a short circuit connection around the winding of the relay 22 and the winding is consequently energized to cause pick-up of the contacts $a$ and $b$ of the relay.

The relay 22 is so designed that the current normally required to energize the winding of the relay is relatively negligible in degree.

Now let it be assumed that the operator of the vehicle desires to apply the brakes to bring the car to a stop. To do so he shifts the controller 11 from the propulsion position 4 back through the coast position into a braking position, such as position 4. In the braking position 4 of the controller 11, the controller switch 26a is opened, thereby interrupting the circuit for energizing the winding of the relay 22. At the same time, controller switches 25a and 28a are actuated to their closed positions.

The contacts of the relay 22 are not immediately restored to their dropped-out positions in response to the opening of the controller switch 26a because of the slow-acting characteristic of relay 22. The slow-acting characteristic is imparted to the relay 22 because of momentarily continued energization of the winding $w$ by current induced in the winding and discharged through the short-circuiting asymmetric device 23, which current is induced in the winding $w$ of the relay 22 due to the dying away of the magnetic flux in the magnetic core associated with the winding of the relay 22. It will be understood that the flow of the current induced in the winding of relay 22 is in the left-hand direction through the asymmetric device 23, in which direction the asymmetric device has a relatively low resistance. The contacts of the relay 22 are thus maintained picked-up, following the interruption of the energizing circuit for winding $w$ thereof, for a certain length of time corresponding to the drop-out time of the relay 22.

A circuit is accordingly completed for energizing the winding of the relay 17. This circuit extends from the positive terminal of the battery 21 by way of the wire 31, controller switch 25a, wire 34, front contact a of the relay 22, wire 35, winding w of the relay 17, wire 36, wire 37, and wire 33 to the negative terminal of the battery 21. The single front contact a of relay 17 is accordingly actuated to its picked-up or closed position.

Upon the pick-up of the contact a of the relay 17, a circuit is completed for energizing the windings 12, 13, 14 and 15 of the magnetic track brake devices to a maximum degree. This circuit extends from the positive terminal of the battery 21 by way of the wire 31, a branch wire 38, transfer contact a of the relay 16 in its dropped-out position shunting resistor 18, wire 39, contact a of relay 17, wire 41, parallel-connected windings 12, 13, 14 and 15 of the magnetic track brake devices, and wire 33 to negative terminal of the battery 21. The windings of the track brake devices are thus energized to a maximum or full degree because neither of the resistors 18 or 19 are included in the circuit thereof.

Due to the full energization of their windings, the magnetic track brake devices are positively actuated into frictional contact with the track rails.

Substantially at the time the magnetic track brake devices engage the track rails, the contacts of the slow-acting relay 22 are restored to their dropped-out positions. The circuit for energizing the winding w of the relay 17, previously traced, is thus interrupted due to the restoration of the contact a of relay 22 to its dropped-out or open position. Consequently, the contact a of the relay 17 is promptly restored to its dropped-out or open position. At the same time, also, the restoration of the back contact b of the relay 22 to its dropped-out or closed position establishes a circuit for energizing the winding w of the relay 16. This circuit extends from the positive terminal of the battery 21 by way of the wire 31, controller switch 28a, a wire 43, winding w of the relay 16, wire 44, back contact b of relay 22, and the wires 37 and 33 to the negative terminal of the battery 21.

The transfer contact a of relay 16 is accordingly actuated from its dropped-out position, in which it shunts the resistor 18, to its picked-up position unshunting the resistor 18 and establishing a circuit, including the resistor 19, for energizing the windings 12, 13, 14, and 15 of the magnetic track brake devices. This circuit extends from the positive terminal of the battery 21 by way of wires 31 and 38, transfer contact a of relay 16, wire 45, resistor 19, wire 41, parallel-connected windings 12 to 15 of the magnetic track brake devices, and wire 33 to the negative terminal of the battery 21.

With the resistor 19 thus in circuit relation with magnetic track brake windings, the windings are energized to a minimum degree. It will thus be seen that when the operator initiates an application of the magnetic track brake devices, the windings are initially fully energized to insure positive movement of the track brake devices into contact with the track rails and then, substantially at the instant that the track brake devices engage the rails, the energizing current is reduced automatically to a low degree adequate to hold the track brake devices in contact with the track rails. Due to the reduction in the degree of energization of the magnetic track brake windings substantially at the instant the track brake devices engage the rails, minimum shock to the vehicle and its occupants results. The reduction of energization in the degree of energization of the magnetic track brake winding is such as to provide a heretofore unattained low degree of brake application upon initiation of a brake application. This inherently widens the percentage range of variation in the degree of braking effect obtainable by the magnetic track brake devices relative to the percentage range of variation of braking effect of heretofore known magnetic track brake devices because in heretofore known magnetic track brake devices the lowest degree of energization of the windings corresponds to the minimum degree sufficient to effect movement of the track brake devices into contact with the rails.

If the operator desires to provide an increased degree of magnetic track brake application, he may do so by displacing the handle of controller 11 further out of its coast position, for example into braking position 5. In this position of the controller 11, the controller switch 27a is closed simultaneously with the controller switch 28a and is effective to establish a circuit for energizing the winding w of the relay 17. This circuit extends from the positive terminal of the battery 21 by way of wire 31, controller switch 27a, wire 47, wire 35, winding w of the relay 17 and wires 36, 37, and 33 to the negative terminal of the battery 21.

Contact a of relay 17 is thus actuated to its picked-up position and is effective in the manner readily apparent in the drawing to connect the resistor 18 in shunt relation to the resistor 19. This automatically effects a reduction of the resistance in series with the windings of the magnetic track brake devices and a corresponding increase in the degree of energization thereof. The magnetic track brake devices are thus effective to produce a higher braking effect.

The operator may cause a still further increase in the degree of application effected by the magnetic track brake devices by shifting the handle of controller 11 still further out of its coast position into braking position 6. In this position of the controller, the controller switch 28a is restored to its open position, thereby interrupting the circuit for energizing the winding w of the relay 16 and causing the consequent restoration of the transfer contact a of the relay 16 to its dropped-out position re-shunting the resistor 18 and opening the circuit through the resistor 19.

The circuit for energizing the magnetic track brake windings 12 to 15 in braking position 6 of the controller 11, thus established, extends from the position terminal of the battery 21 by way of the wires 31, and 38, transfer contact a of the relay 16, wire 39, front contact a of relay 17, wire 41, through the parallel-connected magnetic track brake windings 12 to 15, and wire 33 to the negative terminal of the battery 21. It will be observed that this circuit is the same as previously established upon initiation of magnetic track brake application because relay 17 is picked-up and the relay 16 is dropped-out. The magnetic track brake winding is thus energized to the full degree.

If the handle of controller 11 is shifted into braking position 7, no change in the condition of relays 16 and 17 occurs and thus the windings 12 to 15 remain energized to the maximum degree.

If the controller 11 is operated beyond the braking zone into the trip position or non-operative position, all of the controller switches are opened and thus the windings of all of the relays 16, 17, and 22 are deenergized and the relays dropped-out. With both the relays 16 and 17 in their dropped-out positions, therefore, the circuit for energizing the magnetic track brake windings 12 to 15 is interrupted. The suspension springs for the magnetic track brake devices are thus rendered effective to lift the track brake device from the rails to cause the release of the magnetic track brake devices.

In view of the fact that the operating handle of the controller is ordinarily removed from the controller in the non-operative position while the car is out of service, it will be seen that it is desirable to insure the deenergization of the magnetic track brake windings while the controller is in its non-operative position in order to prevent drainage of current from the battery 21 while the vehicle is out of service.

It will be apparent that if the controller handle is shifted rapidly from a propulsion position through the coast position to braking position 6 or beyond, the automatic reduction in the degree of energization of the magnetic track brake windings is not effected because the relays 16 and 17 are then under the immediate and direct control of the controller 11 instead of partly under the control of the controller 11 and partly under the control of relay 22 as previously described. However, since it is not customary to apply the brakes to the full degree, corresponding to braking positions 6 and 7, except in an emergency, the resultant shock incident to the initial application of the magnetic track brake devices with full energization of the windings thereof is tolerated in the interest of safety, safety of the car and occupants being paramount to minor discomfort of the passengers.

Having now described my invention, what I claim as new and desire to secure by Letters Patent, is:

1. Control apparatus for a magnetic track brake device of the type resiliently suspended above an associated track rail and having an electromagnetic winding effective when energized above a certain degree to cause movement of the track brake device into contact with the track rail, said apparatus comprising a controller having a brake release position and a plurality of brake application positions, a plurality of relays selectively controlled according to the brake application position of the said controller for correspondingly varying the degree of energization of the winding of said track brake device, and timing means controlled by said controller and effective jointly therewith to control said relays for a certain length of time following the instant the controller is first moved to any one of said plurality of brake application positions in a manner to cause energization of the winding of the track brake device to a degree exceeding said certain degree notwithstanding that a different degree of energization of the winding is called for according to the position of the controller.

2. Control apparatus for a magnetic track brake device of the type suspended resiliently above an associated track rail and having an electromagnetic winding effective when energized above a certain degree to cause actuation of the track brake device into contact with the track rail, said apparatus comprising a controller having a brake release position and a plurality of brake application positions, means controlled according to the position of said controller and effective in the different brake application positions thereof to cause energization of the winding of the track brake device to correspondingly different degrees, and a slow-acting relay controlled by said controller and effective jointly therewith for a certain interval of time following the instant that said controller is first shifted out of its brake release position to any one of the brake application positions for controlling the last said means in a manner to effect energization of the winding of the track brake device to a degree exceeding said certain degree notwithstanding that a lesser degree of energization of the winding is called for according to the position of the said controller.

3. Control apparatus for a magnetic track brake device of the type suspended resiliently above an associated track rail and having an electromagnetic winding effective when energized above a certain degree to cause actuation of the track brake device into contact with the track rail, said apparatus comprising a controller having a brake release position and a plurality of brake application positions, a plurality of relatively fast-acting relays selectively controlled in accordance with the particular brake application position of the controller for effecting energization of the winding of the track brake device to correspondingly different degrees, and a relatively slow-acting relay having one position in the brake release position of the controller and operated to a different position in response to movement of the controller out of its brake release position, said slow-acting relay being effective jointly with the controller for an interval of time corresponding to the delay characteristic of the slow-acting relay and terminating substantially at the instant the track brake device engages the track rail in response to energization of the winding thereof for controlling said fast-acting relays in a manner to cause energization of the winding of said track brake device to a degree exceeding said certain degree.

4. Control apparatus for a magnetic track brake device of the type suspended resiliently above an associated track rail and having an electromagnetic winding effective when energized above a certain degree to cause actuation of the track brake device into contact with the track rail, said apparatus comprising a controller having a brake release position and a plurality of brake application positions, a plurality of relatively fast-acting relays selectively controlled in accordance with the particular brake application position of the controller for effecting energization of the winding of the track brake device to correspondingly different degrees, and a relatively slow-acting relay having a winding that is normally energized in the brake release position of the controller and deenergized when the controller is shifted out of its brake release position thereby to cause a change in position of the relay only upon the elapse of a certain interval of time beginning at the instant the controller is shifted out of brake release position to any one of the brake application positions and terminating substantially at the instant the track brake device engages the track rail in response to energization of the winding thereof, said slow-acting relay being effective jointly with said controller to control said fast-acting relays in a manner to cause energization of the winding of the track brake device to a degree exceeding said certain degree during said certain interval of time.

5. Control apparatus for a magnetic track brake device of the type suspended resiliently above a track rail and actuated into contact with the rail by energization of an electromagnetic winding thereof, said apparatus comprising a controller having a certain position in which the winding of the track brake device is deenergized and operative out of said certain position into any one of a plurality of other positions to cause energization of the winding to a plurality of different degrees according to the one of said other positions to which it is moved, timing means independent of the movement of the track brake device and set in operation substantially at the instant said controller is first moved to any one of said other positions, and means controlled by said timing means and effective for a certain interval of time following the instant the timing means is set into operation for causing energization of the winding to one certain degree sufficient to insure positive movement of the track brake device into contact with the rail notwithstanding that a different degree of energization of the winding is called for by the position of the controller.

PHILIP L. CRITTENDEN.